(12) United States Patent
Sundar et al.

(10) Patent No.: US 12,096,095 B2
(45) Date of Patent: Sep. 17, 2024

(54) SYNOPTIC VIDEO SYSTEM

(71) Applicant: Microsoft Technology Licensing, LLC, Redmond, WA (US)

(72) Inventors: Sanal Sundar, Bengaluru (IN); Raghu Jothilingam, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/743,090

(22) Filed: May 12, 2022

(65) Prior Publication Data
US 2023/0370696 A1   Nov. 16, 2023

(51) Int. Cl.
*H04N 21/8549* (2011.01)
*G06F 40/279* (2020.01)
*G06F 40/58* (2020.01)
*G11B 27/036* (2006.01)

(52) U.S. Cl.
CPC ....... *H04N 21/8549* (2013.01); *G06F 40/279* (2020.01); *G06F 40/58* (2020.01); *G11B 27/036* (2013.01)

(58) Field of Classification Search
CPC ... H04N 21/8549; G06F 40/279; G06F 40/58; G11B 27/036
USPC ......................................................... 386/285
See application file for complete search history.

(56) References Cited

U.S. PATENT DOCUMENTS

| | | | |
|---|---|---|---|
| 9,607,611 B2 | 3/2017 | Dayan et al. | |
| 10,283,164 B2 | 5/2019 | Axen et al. | |
| 10,290,320 B2 * | 5/2019 | Hu | H04N 21/233 |
| 10,719,668 B2 * | 7/2020 | Morehead | G06F 40/30 |
| 11,423,945 B1 * | 8/2022 | Seth | G11B 27/34 |
| 11,556,531 B2 * | 1/2023 | Mueller | G06F 16/2453 |

(Continued)

FOREIGN PATENT DOCUMENTS

| | | |
|---|---|---|
| WO | 2014173370 A1 | 10/2014 |
| WO | 2016157150 A1 | 10/2016 |

OTHER PUBLICATIONS

"Videolize your Story with AI", Retrieved from: https://web.archive.org/web/20200618124706/https:/www.gliacloud.com/en/, Jun. 18, 2020, 5 Pages.

(Continued)

*Primary Examiner* — Helen Shibru
(74) *Attorney, Agent, or Firm* — Schwegman Lundberg & Woessner, P.A.

(57) ABSTRACT

Systems and methods are directed to generating a synoptic video from one or more documents. The system receives an indication to generate the synoptic video and in response, accesses the one or more documents and user preferences of a user that are derived by the network system. The one or more documents are analyzed to determine relevant text content, whereby the analyzing includes tagging the relevant text content. Based on the user preferences, the system generates the synoptic video that summarizes the tagged relevant text content. The content and style of the synoptic video is based on a user style indicated by the user preferences. For example, the user preference can determine a depth of the summarized content, a type of audio or text used, an amount of images to provide, and an amount of summarized text to provide. The synoptic video can then be displayed to the user.

20 Claims, 8 Drawing Sheets

(56) References Cited

U.S. PATENT DOCUMENTS

| | | | |
|---|---|---|---|
| 11,748,408 B2* | 9/2023 | Mayo | G06F 16/24575 |
| | | | 707/722 |
| 2009/0157407 A1 | 6/2009 | Yamabe et al. | |
| 2017/0193349 A1* | 7/2017 | Jothilingam | G06N 20/20 |
| 2017/0206930 A1* | 7/2017 | Innami | G11B 27/34 |
| 2020/0210647 A1 | 7/2020 | Panuganty et al. | |
| 2020/0366952 A1 | 11/2020 | Liu et al. | |
| 2021/0319781 A1 | 10/2021 | Gullo | |
| 2022/0292160 A1* | 9/2022 | Mehta | G06F 16/972 |
| 2022/0392493 A1* | 12/2022 | Pi | G06F 16/7844 |
| 2023/0163988 A1* | 5/2023 | Wells | G06F 16/345 |
| | | | 715/254 |

OTHER PUBLICATIONS

"International Search Report and Written Opinion Issued in PCT Application No. PCT/US2023/013446", Mailed Date: Jul. 17, 2023, 20 Pages.

"Invitation to Pay Additional Fees Issued in PCT Application No. PCT/US23/013446", Mailed Date: May 26, 2023, 17 Pages.

\* cited by examiner

US 12,096,095 B2

SYNOPTIC VIDEO SYSTEM

TECHNICAL FIELD

The subject matter disclosed herein generally relates to video generation. Specifically, the present disclosure addresses systems and methods that generate a synoptic video from one or more documents.

BACKGROUND

Content consumers tend to watch videos when there is a choice between reading content or viewing a video about the content. Current video generation solutions require users (e.g., content providers) to manually create aspects of a video. With the trend towards presenting ideas and communicating through videos, this is a significant deficiency in the art. In particular, there does not exist can systems that generate videos from text to provide an automated short, curated video from the text.

BRIEF DESCRIPTION OF THE DRAWINGS

Some embodiments are illustrated by way of example and not limitation in the figures of the accompanying drawings.

DETAILED DESCRIPTION

Figure 1:
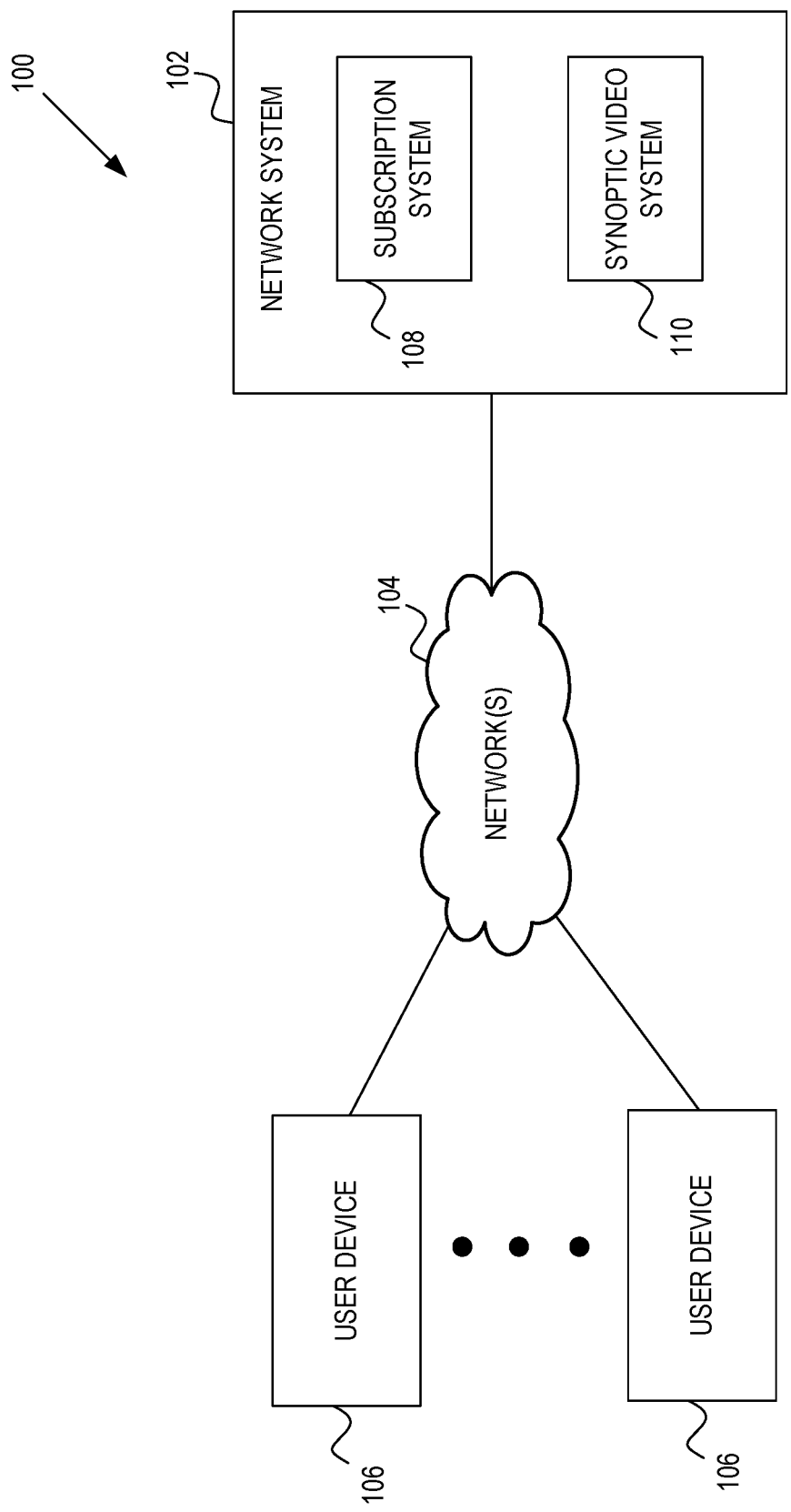
FIG. 1 is a diagram illustrating a network environment suitable for automatically generating synoptic videos from one or more documents, according to some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Example embodiments provide a system for automatically creating synoptic curated videos that summarize one or more documents (e.g., text document, slides, transcriptions of meetings) based on a user's own style. Every individual understands content differently. Content Intelligence breaks the complex information in the documents into visual points that align to mental model of a user's thought process. The visual points help to bring the curated visual representation of any given aspect the user is interested about. Thus, example embodiments derive user preferences for each individual that indicates how each individual likes to understand and interact with the videos. Using these derived user preferences, the system can generate a curated visual representation of any given aspect the user is interested about.

In some embodiments, the documents comprise deep chainable segments of content that can provide different levels of depth in summarizing relevant text content in the documents. The documents are analyzed to determine keywords and core concepts in order to identify an entry point for the text. The entry point provides a point-in-time focal point where a trigger to visual point a particular document is done from. Important segments or portions of the documents are then tagged (either manually by the user or automatically by the system). The tagging can include generalized tags (e.g., content can be summarized) and specific tags (e.g., content can be used as-is) that form the basis of the synoptic video. Thus, the tags can denote type of content and interaction points.

The tagged portions can then be used to generate the video. A storyline can be built (e.g., by scanning all of the tagged portions) which is used as a generative visual hint for the video. Generating the storyline can include translating the content into a preferred language of a user (e.g., content consumer). Text-to-speech scripts are also generated and voice overs can be added (e.g., via an overlay). In some cases, closed captioning can also be included using overlays. Relevant images from the documents or from related documents that the user has an association with are accessed (e.g., retrieved from the documents). Using all of this information (e.g., overlays, images), frames of the video are generated. The video is then generated by combining all of the frames.

In various embodiments, the content in the video, including depth of the content, is based on user style and preferences. The user style or preferences are learned by the system from one or more of questionnaires, sample video feedback, sample topic interactions, and generated video feedback. Thus, if a first user is very interested in a topic of the video or otherwise wants more than a mere summarization of the topic, the video will contain more details. Given the same documents, a video generated for a first user will be different than a video generated for a second user that is not as interested in the topic and only wants an overview of the topic. In further examples, the first user may have a style that indicates a preference for more images than text; a male voice with low pitch as the audio; particular font style, size, and color; and so forth.

As a result, example embodiments provide a technical solution for automatically generating a synoptic video for a user that is customized to the user based on their preferences. The technical solution does not require the overhead of a first user (e.g., a content provider) manually generating different videos for a plurality of second users (e.g., consumers of the video) that each may having different user preferences or a different need in understanding the content. As a result, one or more of the methodologies described herein facilitate solving the technical problem of creating customized, curated videos for a plurality of users having different preferences.

FIG. 1 is a diagram illustrating a network environment 100 suitable for automatically generating synoptic videos from one or more documents, in accordance with example embodiments. A network system 102 are communicatively coupled, via a network 104, to a plurality of user devices 106. In some embodiments, the network system 102 are associated with a single entity (e.g., software provider). The network system 102 comprises a subscriber system 108 such as, for example, Microsoft 365 and a synoptic video system 110. The subscriber system 108 can comprise a cloud-based software-as-a-service (SaaS) system that provides a plurality of applications that generate, edit, and display documents that are used by the synoptic video system 110. For example, the subscriber system 108 can provide a word processing application that provides text documents, a spreadsheet application that provides spreadsheets, a presentation application that provides presentation slides, and a meeting application that provides transcriptions of virtual meetings.

The synoptic video system 110 is configured to automatically generate curated synoptic videos from one or more documents that may be generated by, or associated with, the subscriber system 108. The documents can include text documents, presentation slides, spreadsheets, transcriptions of virtual meetings, or any other document that contains content that can be summarized. In some cases, the generation of the synoptic video occurs in real-time (e.g., as a virtual presentation or meeting is occurring). The synoptic video system 110 will be discussed in more detail in connection with FIG. 2 through FIG. 5 below.

Each user device 106 is a device of a user of the network system 102. In some instances, the user device 106 is a device of a content provider that wants to summarize their document(s) into one or more videos for subsequent users. For example, the content provider can be a teacher generating videos for students (e.g., of a lecture) or a member of an organization or group (e.g., a manager) generating videos for new members of the organization or group (e.g., new employees). In other instances, the user device 106 is a device of a user hosting or attending a virtual meeting. Further still, the user device 106 can be a device of a user that wants to access and view a synoptic video regarding a particular topic (e.g., a student that wants multiple documents on a topic turned into a synoptic video).

The user devices 106 may comprise, but are not limited to, a smartphone, tablet, laptop, multi-processor systems, microprocessor-based or programmable consumer electronics, game consoles, set-top boxes, a server, or any other communication device that can perform operations with respect to the network system 102 via the network 104. The operations can include, for example, generating, editing, and viewing documents associated with the subscription system 108, providing feedback to generate and refine their user preferences, and viewing and interacting with synoptic videos generated by the synoptic video system 110.

Depending on the form of the user devices 106, any of a variety of types of connections and networks 104 may be used. For example, the connection may be Code Division Multiple Access (CDMA) connection, a Global System for Mobile communications (GSM) connection, or another type of cellular connection. Such a connection may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks, 5G networks). When such technology is employed, the network 104 includes a cellular network that has a plurality of cell sites of overlapping geographic coverage, interconnected by cellular telephone exchanges. These cellular telephone exchanges are coupled to a network backbone (e.g., the public switched telephone network (PSTN), a packet-switched data network, or other types of networks).

In another example, the connection to the network 104 is a Wireless Fidelity (Wi-Fi, IEEE 802.11x type) connection, a Worldwide Interoperability for Microwave Access (WiMAX) connection, or another type of wireless data connection. In some embodiments, the network 104 includes one or more wireless access points coupled to a local area network (LAN), a wide area network (WAN), the Internet, or another packet-switched data network. In yet another example, the connection to the network 104 is a wired connection (e.g., an Ethernet link) and the network 104 is a LAN, a WAN, the Internet, or another packet-switched data network. Accordingly, a variety of different configurations are expressly contemplated In example embodiments, any of the systems, devices, or services (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system, device, or machine. For example, a special-purpose computer system able to implement any one or more of the methodologies described herein is discussed below with respect to FIG. 9, and such a special-purpose computer is a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any of the components illustrated in FIG. 1 or their functions may be combined, or the functions described herein for any single component may be subdivided among multiple components. Additionally, any number of user devices 106 may be embodied within the network environment 100. While only a single network system 102 is shown, alternative embodiments contemplate having more than one network system 102 to perform the operations discussed herein (e.g., each localized to a particular region).

Figure 2:
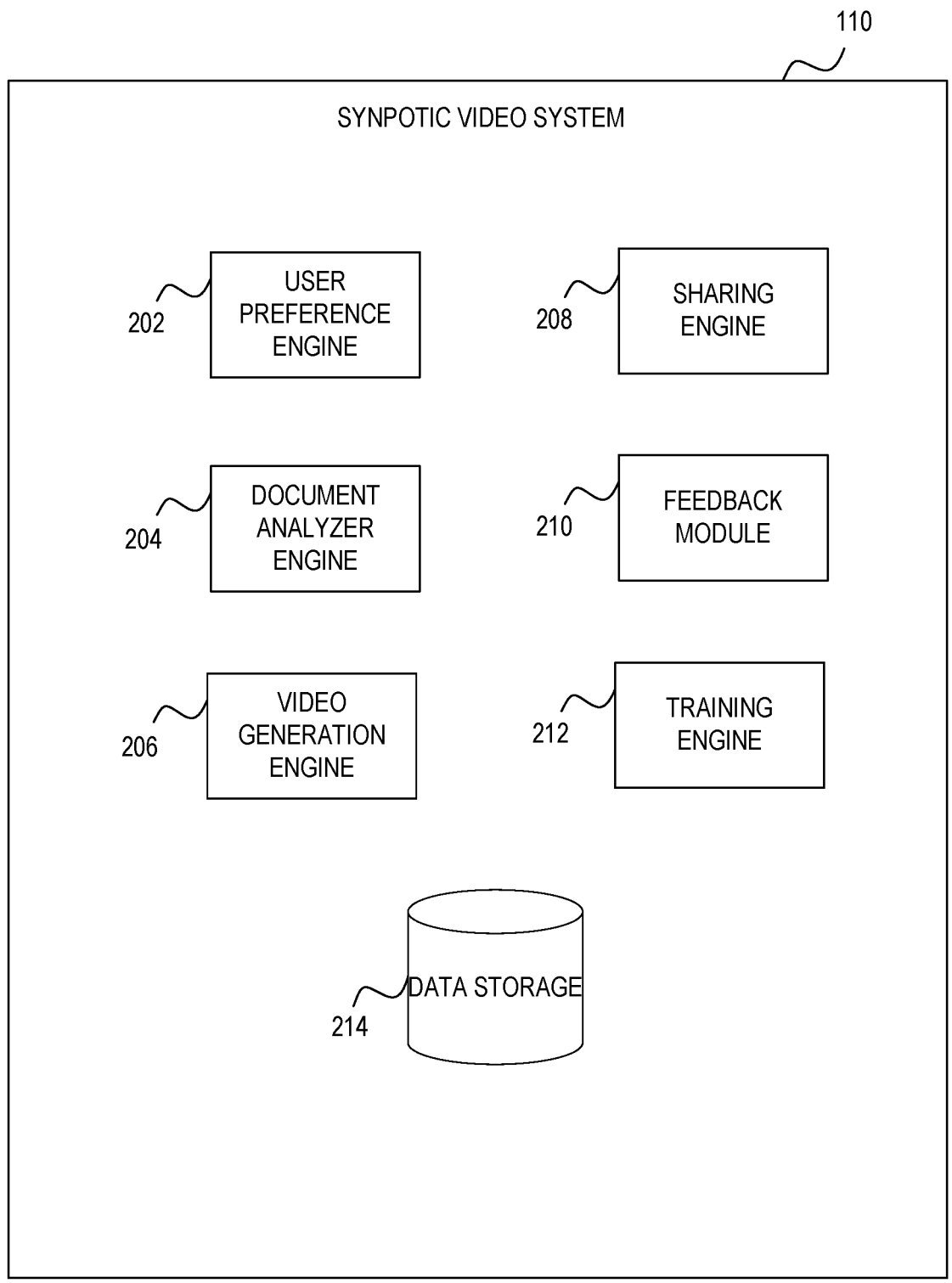
FIG. 2 is a diagram illustrating components of a synoptic video system, according to some example embodiments.

FIG. 2 is a diagram illustrating components of the synoptic video system 110, according to some example embodiments. The synoptic video system 110 is configured to generate and maintain user preferences, analyze documents, and use those user preferences in generating synoptic videos from the analyzed documents. To enable these operations, the synoptic video system 110 comprises a user preference engine 202, a document analyzer engine 204, a video generation engine 206, a sharing engine 208, a feedback module 210, a training engine 212, and a data storage 214 all configured to communicate with each other (e.g., via a bus, shared memory, or a switch). Alternative embodiments may comprise more or less components, combine the functions of some these components into a single component, or making some components optional.

The user preference engine 202 is configured to determine user preferences that indicate a user's style and the way the user likes to understand and interact with videos. For example, the user preferences can indicate what sections of videos the user likes to see or interact with, topics the user is interested in, and/or a level of interest that a user has for various topics. The user preferences can be stored to the data storage 214. These user preferences can then be used by other components of the synoptic video system 110 to generate personalized synoptic videos. The user preference engine 202 will be discussed in more detail in connection with FIG. 3.

The document analyzer engine 204 is configured to analyze documents from which the synoptic videos will be generated. The analysis includes analyzing and understanding content within the documents and tagging elements of the documents that will be used to generate the synoptic videos. The document analyzer engine 204 will be discussed in more detail in connection with FIG. 4.

The video generation engine 206 is configured to generate the synoptic videos. In example embodiments, the video generation engine 206 generates a "storyline" for each synoptic video, generates text and speech for the synoptic videos, obtain images, and builds each synoptic video. The generated synoptic videos can be stored to the data storage 214. The video generation engine 206 will be discussed in more detail in connection with FIG. 5.

The sharing engine 208 is configured to maintain and provide access to synoptic videos that are generated. In various embodiments, a user may decide to share a synoptic video that is created based on their user preferences. The sharing engine 208 provides the user with a selectable option to store the synoptic video to a knowledge sharing platform, which is accessible by other users on the network environment 100. In some embodiments, the synoptic videos are stored to the data storage 214. The knowledge sharing platform can maintain a catalog of synoptic video and other users can view and search the catalog to access a synoptic video that they are interested in. Further still, a first user can provide a link (e.g., a URL) for a synoptic video maintained by the sharing engine 208 to a second user.

In some cases, the shared synoptic video may be generated from a virtual (video) meeting. In these cases, the virtual meeting can provide a selectable option (e.g., button, icon) in a user interface that triggers generation of the synoptic video. When this selectable option is activated, the synoptic video system 110 can generate, for example, a one- or two-minute synoptic video of the virtual meeting.

In some embodiments, the sharing engine 208 creates a linked view of contents of the sharing platform based the user's level and background. In some cases, the user's level and background can be determined from, for example, a team's design documents using the subscription system 108. For example, if the user is a software engine in a particular department working on a project, their synoptic video(s) may be specific to the project and be more in-depth than, for instance, a CEO of an organization that oversees multiple departments. Here, the CEO may be provided links to high-level summary synoptic video(s) that merely provide an overview of various projects.

The feedback module 210 is configured to monitor for user interactions with the synoptic videos. For example, the feedback can include sections of synoptic videos the user interacted with (e.g., repeated viewing, paused) and/or ratings provided by the user (e.g., for the entire synoptic video or portions of the synoptic video). All of the feedback can be used to update the user preferences and/or retrain various machine-learning models used by example embodiments. As such, the feedback module 210 may provide the feedback to the user preference engine 202 and the training engine 212.

The training engine 212 is configured to train/retrain machine-learning (ML) models used by various components of the synoptic video system 110. The training engine can receive the feedback from the other components of the synoptic video system 110 (e.g., the feedback module 210, the document analyzer engine 204) and extract features that are used to retrain ML models. For example, tags and tagged content can be extracted to train one or more tagging models. In another example, features directed to converting text to speech can be extracted to retrain one or more text-to-speech ML models. Further still, content can be extracted to retrain one or more content classifier ML models. The training engine 212 can also work with the user preference engine 202 to train user preference ML models.

The synoptic video system 110 also includes the data storage 214 configured to store various information generated and used by the synoptic video system 110. In example embodiments, the data storage 214 can store user preferences, ML models, and/or generated synoptic videos. While the data storage 214 is shown as a single storage device, the data storage 214 can comprise a plurality of storage devices (e.g., each storing a different type of data).

While various components of the user preference engine 202, document analyzer engine 204, and video generation engine 206 will be discussed below, it is noted that these components or their functionalities may be located in a different engine or be combined with another component within the same or different engine.

Figure 3:
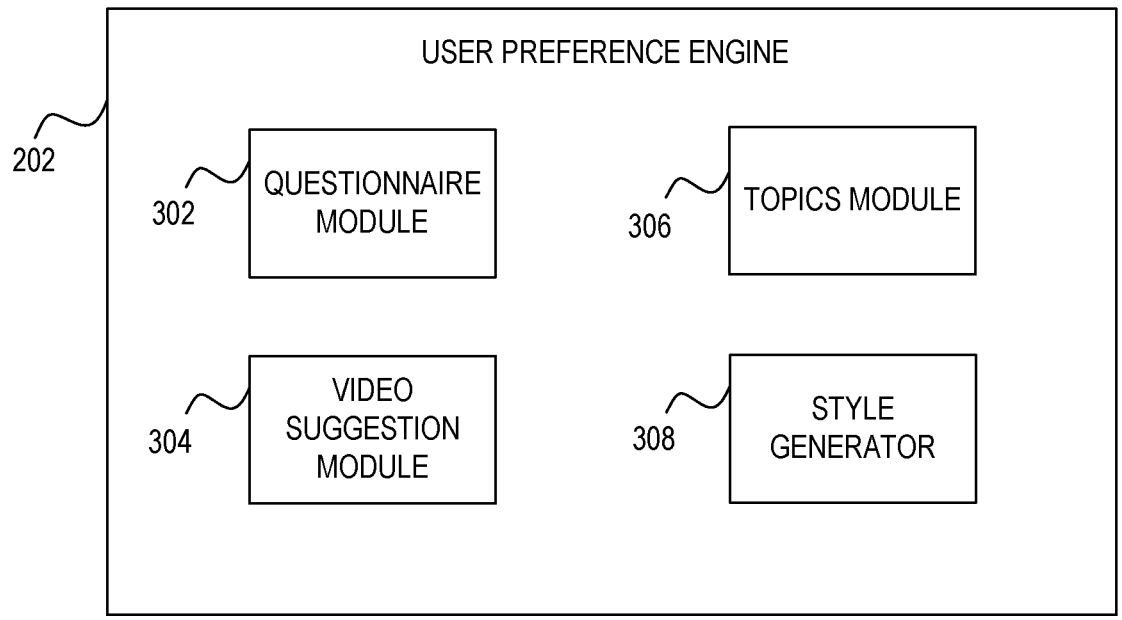
FIG. 3 is a diagram illustrating components of a user preference engine, according to some example embodiments.

FIG. 3 is a diagram illustrating components of the user preference engine 202, according to some example embodiments. The user preference engine 202 is configured to derive user preferences that indicate a user's style and the way the user likes to understand and interact with videos. Example embodiments generate videos based on an understand of how a user wants their synoptic video (e.g., context, style, and preferences). Based on feedback from questionnaires and sample videos, the system can learn and build this understand. To provide these operations, the user preference engine 202 may comprise a questionnaire module 302, a video suggestion module 304, a topics module 306, and a style generator 308.

The questionnaire module 302 is configured to identify user preferences based on one or more questionnaires provided to the user. Using the questionnaire, the user can log what they like and what resonates with them by providing answers to the questionnaires. For example, the questionnaire can inquire as to what topics the user is interested in and how interested the user is for particular topics.

The video suggestion module 304 is configured to determine user preferences based on sample videos shown to the user. The video suggestion module 304 provides the user with one or more videos and asks the user to view and interact with the video(s). The video suggestion module 304 then captures the likes of the user and the interaction points. In various embodiments, the video suggestion module 304 provides multiple different "flavors" to understand where the user interests lies and the different ways and types of content the user likes.

The topics module 306 is configured to determine how the user likes to understand topics. In example embodiments, the topic module 306 provides a sample topic to the user. The sample topic may be derived from user preferences identified by the questionnaire module 302. The user is then asked to describe the topic in their own words and/or build a story around the topic. Based on the user's input, the topics module 306 builds an understanding of how the user likes to describe the particular topic with their particular style.

The style generator 308 is configured to generate the overall user style (also referred to herein as "user resonation style") based on the determinations and interaction points from the video suggestion module 304 and the topics module 306. For example, the style generator 308 can match different interaction points with how the user likes to understand topics and derive a story telling style. In some embodiments, a machine-learning (ML) model may be used to determine the story telling style. For example, the interaction points and determined preferences can be features applied to the ML model to obtain the story telling style. In various embodiments, the style can also indicate, for example, preferred background, preferred font style/types, preferred types of images, style(s) in which to play the video, amount of text to provide, and/or whether the user prefers lots of text or lots of images. For example, if the topic is travel, the user may want it more visually descriptive, and the style will indicate to use more images. Similarly, if the user is interested in photography, the style will indicate to keep things more visual.

Figure 4:
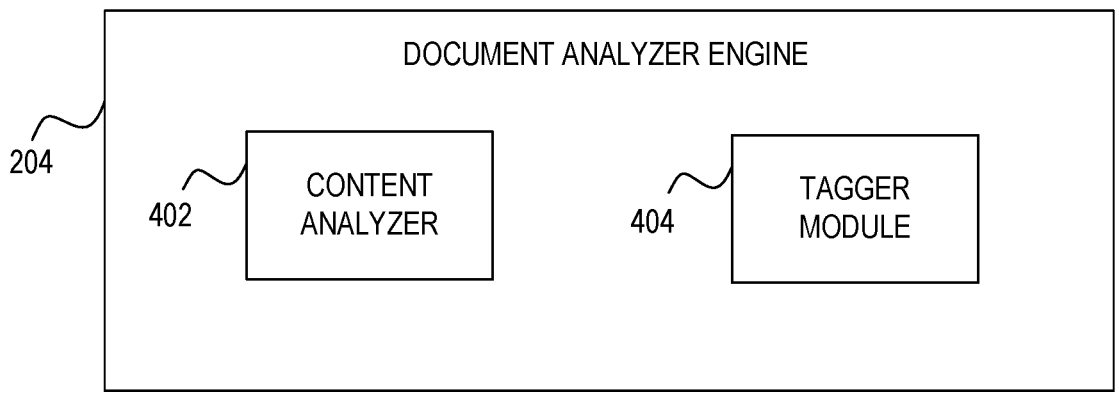
FIG. 4 is a diagram illustrating components of a document analyzer engine, according to some example embodiments.

FIG. 4 is a diagram illustrating components of the document analyzer engine 204, according to some example embodiments. The document analyzer engine 204 is configured to analyze documents from which the synoptic videos will be generated. The analysis includes analyzing and understanding content within the documents and tagging elements of the documents that will be used to generate the synoptic videos. To perform these operations, the document analyzer engine 204 comprise a content analyzer 402 and a tagger module 404.

The content analyzer 402 analyzes one or more documents that will be used to generate a synoptic video. In example embodiments, a user will indicate a document or a plurality of documents from which a synoptic video should be generated. Based on this indication, the content analyzer 402 accesses the indicated document(s).

The content analyzer 402 comprises or accesses one or more text analyzers and ML models which are used to understand content in the documents. For instance, when a user types in a word processing application of the subscription system 108, text analyzers and/or ML models can automatically suggest next texts. Thus, the text analyzers and ML models can understand what a thought process is for various content in the documents and/or what content should come next. Similarly, the content analyzer 402 uses the text analyzers and ML models to identify text patterns in the documents. One or more of the ML models can determine core keywords in the documents. Those keywords provide an understanding of an entry point for the text in the document. For example, the content analyzer 402 can use the ML models and text classifiers to identify the heaviest words or most rated words, and from there, the content analyzer 402 can determine the context and the entry point.

The tagger module 404 is configured to tag content in the document(s). Tagging identifies relevant content in the document(s). The tagging can occur at two levels—generalized and specific. The crux of the content can be tagged with specific tags so that the content can be used as-is. In contrast, content that is tagged as generalized can provide an explanation or understanding that can be summarized.

In example embodiments, the tagger module 404 uses content intelligences to automatically tag the content in the document(s). Automatically tagging uses machine-learning (e.g., one or more ML models) to tag the content. The tagging can be based on relevance, weights, and word cloud (e.g., based on the speaker's/document creator's emotions). In some cases, a user (e.g., creator of the document, user for whom the synoptic video will be generated) can also provide an indication to tag the content and the tagger module 304 detects these indications. By tagging the content, the complex information can be broken into visual points that can be aligned to a mental model of a user's thought process.

Figure 5:
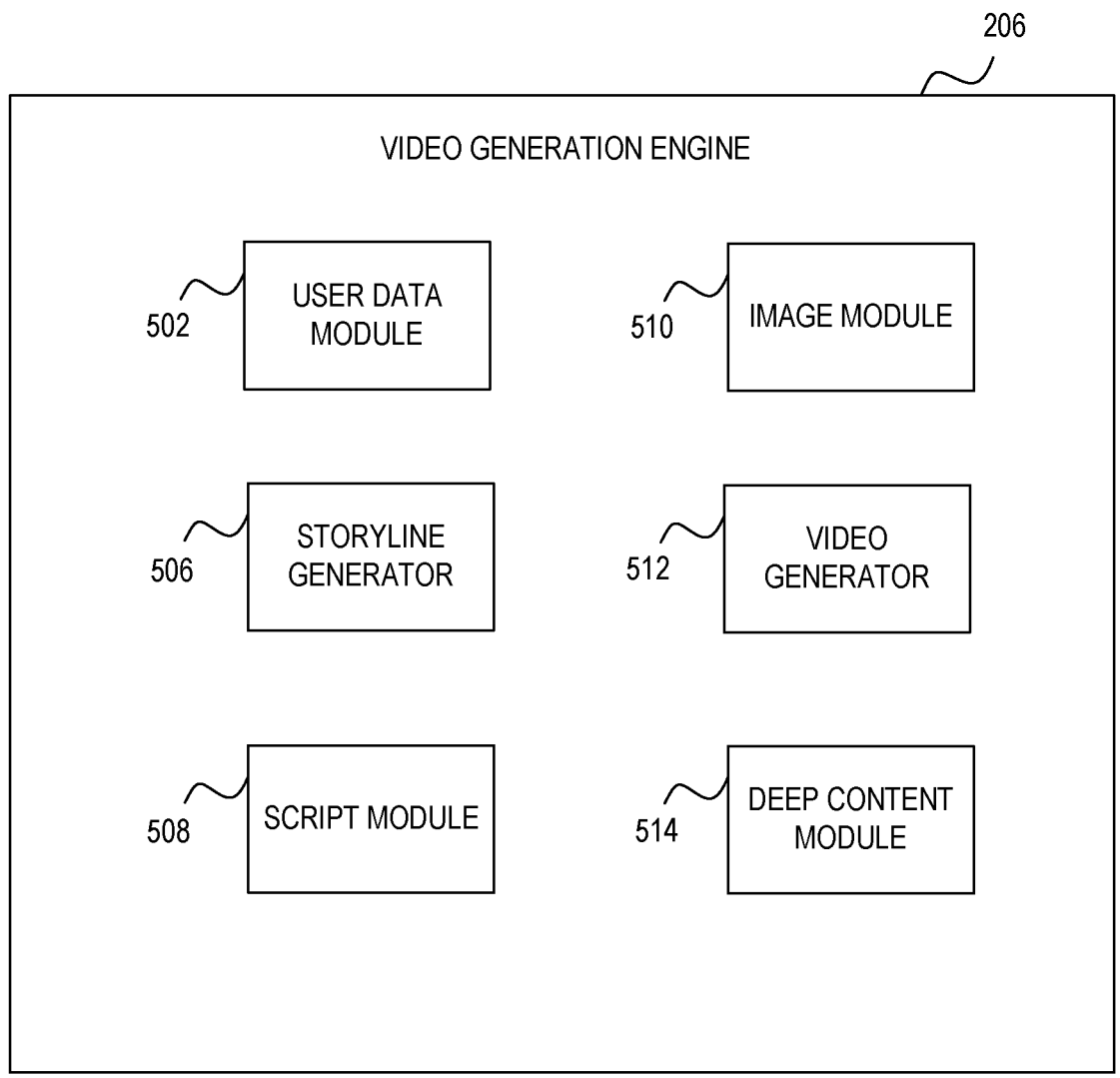
FIG. 5 is a diagram illustrating components of a video generation engine, according to some example embodiments.

FIG. 5 is a diagram illustrating components of the video generation engine 206, according to some example embodiments. The video generation engine 206 is configured to generate the synoptic videos. In example embodiments, the video generation engine 206 generates a "storyline" for each synoptic video, generates text and speech for the synoptic videos, obtain images, and builds each synoptic video. To perform these operations, the video generation engine 206 comprises a user data module 502, a storyline generator 506, a script module 508, an image module 510, a video generator 512, and a deep content module 514.

The user data module 502 is configured to manage background information for the user. The background information can be retrieved by the user data module 502 from the subscription system 108 and can indicate interactions and content use in the subscription system 108 through graphs and interaction points. For example, the user can have an account with the subscription system 108 in which details are stored. These details can include their likes and past interactions on the subscription system 108. The graphs provide data about the interaction points from the subscription system 108 since any interaction with an application of the subscription system 108 gets stored in a substrate of the subscription system 108. Thus, the background information can indicate, for example, user interests and documents the user has interacted with or has access to. These documents can include the documents that are used to generate the synoptic videos (e.g., providing the text and/or the images).

The background information can be combined with the tags through a graph database (e.g., Office Graph), which can divide the text into visual points based on aspect's of the user's interests. In some embodiments, the user data module 502 applies user specific data on the text of the document (e.g., locale specific) to create a system understanding of language in the text. In one embodiment, the user data module 502 can translate content in the document(s) into a language style best understood by the user based on their user preferences and/or user style.

The storyline generator 506 is configured to generate a storyline for the synoptic video. In example embodiments, the storyline generator 506 builds text (e.g., sentences) based on the tags in the document(s). Specifically, the storyline generator 506 scans the content using the tags to build these sentences by summarizing the tagged content into a few-line description. In some cases, the summarizing uses ML models that are text builders that generate a meaningful sentence out of a given phrase that aligns to the context of the content in the document(s). The summarized text may then be used to generate the storyline. In some cases, the building of the storyline can include translating the summarized text to a user's preferred language. The storyline can then be used as a generative visual hint for the synoptic video.

The script module 508 is configured to manage script(s) used in generating the synoptic video. In example embodiments, the script module 508 generates text-to-speech script(s). The script generator 508 may generate the script(s) based on the storyline (e.g., from the storyline generator 506) and based on user preferences. In various embodiments, the script(s) can indicate emotion, male/female voice usage, visual hints, pauses, modulation, confidence, and so forth. Based on the script(s), speech can be generated by the script generator 508 via a speech overlay. In example embodiments, the script generator 508 uses available ML models that convert text to speech in generating the speech overlay.

Additionally, the script module 508 can automatically generate closed captions or citations based on the script(s) and/or the speech overlay. The closed captions can also be embedded in the synoptic video using an overlay.

The image module 510 is configured to manage visual aspects of the synoptic video. In example embodiments, the image module 510 retrieves relevant images from the documents to be used in the synoptic video. In some cases, the image module 510 can access other documents associated with the user from the subscription system 108 and retrieve images based on context of the synoptic video being generated. For example, the documents may have been created, edited, or viewed by the user or documents that the user otherwise has access rights to (e.g., based on the background information).

The video generator 512 generates the synoptic video. Using the images, script(s), and overlays, the video generator 512 generates each frame of the synoptic video. In example embodiments, a frame is a single page of the synoptic video. The frame can include text, one or more images, and/or audio. The frame can also include closed captioning. Some of these components of the frame may be embedded into the frame using overlays (e.g., speech overlay, closed caption overlay). The video generator 512 then stitches the frames together to generate the synoptic video.

In example embodiments, the video generator 512 checks that the user resonation style matches the generated synoptic video. The video generator 512 accesses the user resonation style from the data storage 214 to perform the check. The user resonation style has checkpoints that indicate the user' style. For example, these checkpoints are used to look for words and weights for each word for a match. In one embodiment, the video generator 512 applies user specific details along with an indicated user style score from the data store that is required for a particular part of the style to match. This is compared with individual styles applied to parts of the video to match. For the match to happen, the system first converts the style content into a visual point specific system language to translate into styles and its scores with instructions that are used to match the contents. The instructions also contain the latest user feedback to consider for the match. It then considers the user feedback from the previous match suggestions to improve the match to specific details that the user wants to focus on. Assuming the synoptic video generally matches the user resonation style, the synoptic video can then be presented to the user.

The deep content module 514 is configured to provide a more in-depth (deep content) synoptic video. In some embodiments, the deep content module 514 generates the deep content synoptic video by adding more information (e.g., highlights) to a (summary) synoptic video. In some embodiment, the deeper content is based on relevant keywords, whereby the text in the document(s) may be mined based on a current context for more in-depth information. The context may be built, for example, based on previous information in the synoptic video and based on a current user. For example, if the current user has indicated an interest in the topic or requires more than just a synopsis on the topic, the user preferences of the user will indicate this desire for a higher level of depth in the content. As a result, the deep content module 514 can work with the other components of the synoptic video system 110 to add more entities (e.g., frames) to the synoptic video whereby the additional entities comprise deeper content on the topic (e.g., more detailed content). In some cases, the deep content module 514 can validate the deep content synoptic video before the user sees it.

Thus, deep content is added to the synoptic video based on the user's preferences. If the user is not interested in deep content for the particular topic/subject, then it is skipped, and a summary synoptic video can be provided.

Figure 6:
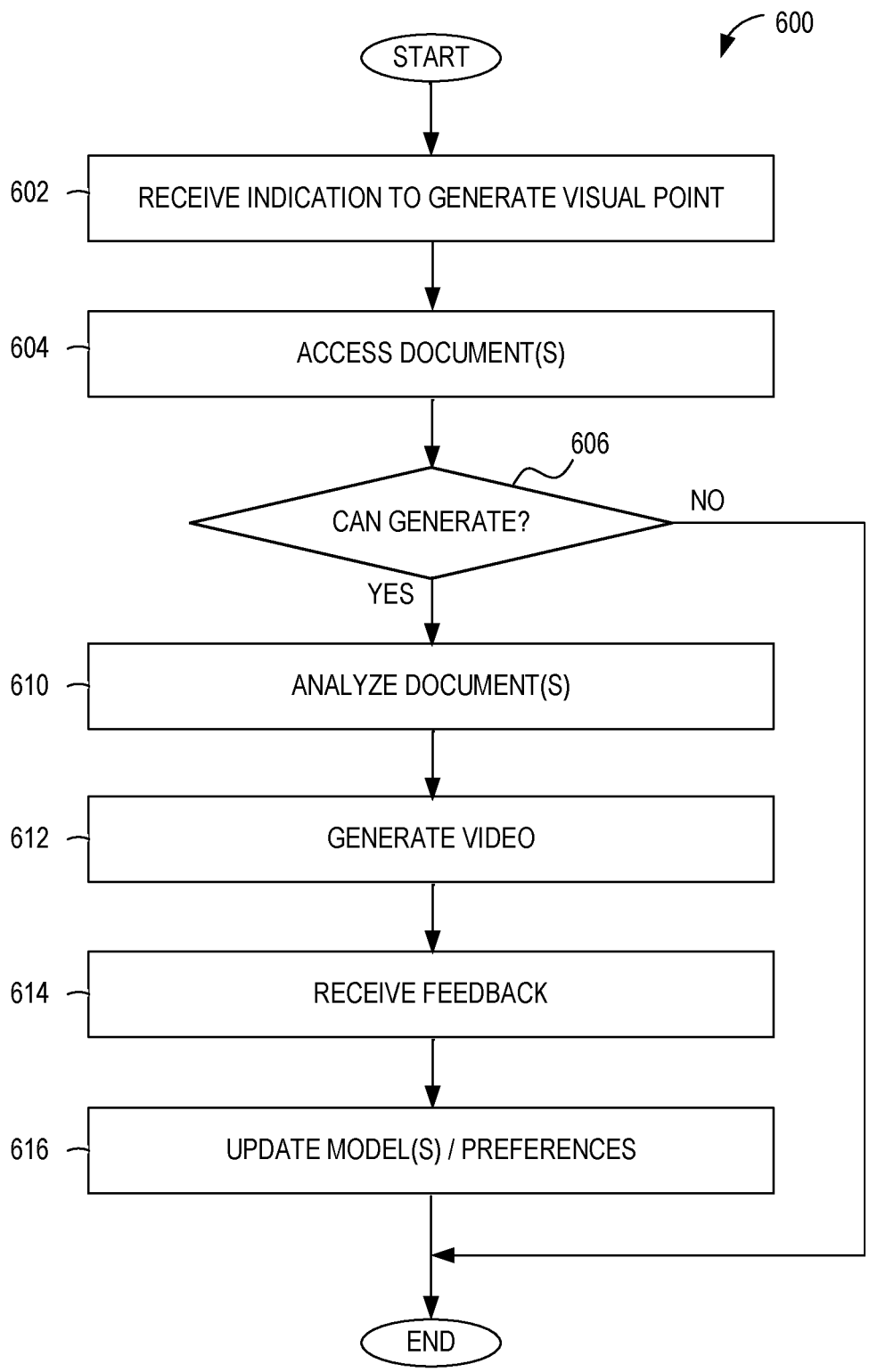
FIG. 6 is a flowchart illustrating operations of a method for generating a synoptic video and updating models and preferences, according to some example embodiments.

FIG. 6 is a flowchart illustrating operations of a method 600 for generating a synoptic video and updating models and preferences, according to some example embodiments. Operations in the method 600 may be performed by the network system 102 in the network environment 100 described above with respect to FIG. 1-FIG. 5. Accordingly, the method 600 is described by way of example with reference to these components in the network system 102. However, it shall be appreciated that at least some of the operations of the method 600 may be deployed on various other hardware configurations or be performed by similar components residing elsewhere in the network environment 100. Therefore, the method 600 is not intended to be limited to these components.

In operation 602, the synoptic video system 110 receives an indication to generate a synoptic video (also referred to as a visual point). In a meeting embodiment (e.g., virtual meeting, virtual or recorded class), a selectable option (e.g., button, icon) that triggers generation of the synoptic video is provided on a meeting user interface. When this selectable option is activated, the synoptic video system 110 receives the indication to generate the synoptic video. In other embodiments, a user may desire to have one or more documents summarized for themselves or for viewing by others. In these embodiments, a selectable option that triggers the generation of the synoptic video may be provided by the subscription system 108 (e.g., via one or more applications of the subscription system 108) or by the synoptic video system 110 via a user interface. The user may indicate the document(s) that are to be summarized when selecting the selectable option.

In operation 604, the synoptic video system 110 (e.g., the document analyzer engine 204) accesses the document(s). The document(s) can be a text document, a spreadsheet, a presentation (e.g., slides), and/or a transcription of a virtual meeting. In some cases, the transcription is automatically generated by a meeting application of the subscription system 108.

In operation 606, a determination is made, by the synoptic video system 110, whether the synoptic video can be made. If a synoptic video can be made than the process 600 proceeds to operation 610 where the document(s) are analyzed. Operation 610 will be discussed in more detail in connection with FIG. 7. However, if a synoptic video cannot be generated, then the method 600 ends. For example, a document may be in the wrong format, the document may not contain enough text that can be analyzed and summarized, the user does not have access/rights to the document (e.g., based on the background information), or there are no resources.

In operation 612, the synoptic video system 110 generates the synoptic video. Operation 612 will be discussed in more detail in connection with FIG. 8.

In operation 614, the feedback module 210 receives feedback from a user viewing the synoptic video. The feedback can include interactions of the user, sections of the video the user interacted with (e.g., repeated viewing, paused), and/or ratings provided by the user (e.g., for the entire synoptic video or portions of the synoptic video).

In operation 616, the synoptic video system 110 updates models and user preferences. In some embodiments, the feedback is provided to the user preference engine 202, which uses the feedback to update (e.g., using machine learning) user preferences. In some embodiments, the feedback is provided to the training engine 212, which trains or retrains machine-learning (ML) models used by various components of the synoptic video system 110. The training engine 212 can extract features from the feedback that are used to retrain the ML models. For example, tags and tagged content can be extracted to train one or more tagging models. In another example, features directed to converting text to speech can be extracted to retrain one or more text-to-speech ML models. Further still, content can be extracted to retrain one or more content classifier ML models. The training engine 212 can also work with the user preference engine 202 to train user preference ML models.

Figure 7:
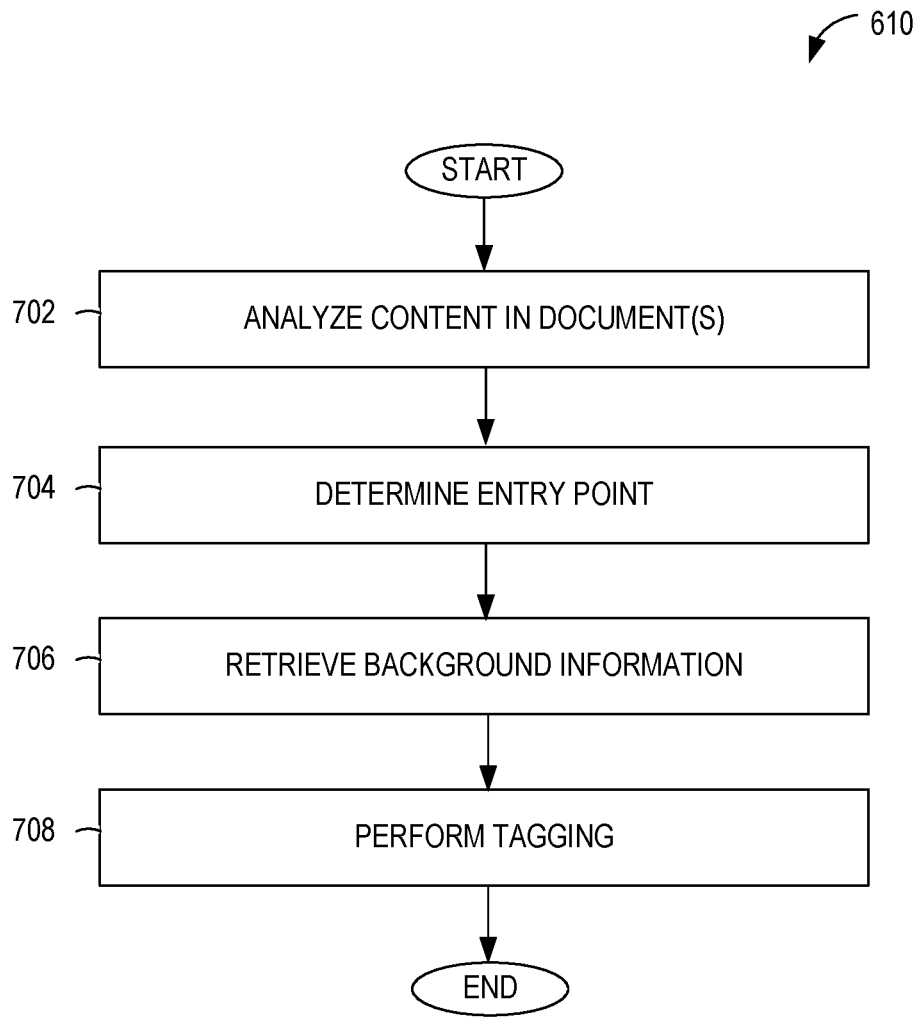
FIG. 7 is a flowchart illustrating operations of a method for analyzing documents for synoptic video generation, according to some example embodiments.

FIG. 7 is a flowchart illustrating operations of a method (operation 610) for analyzing documents for synoptic video generation, according to some example embodiments. Operations in the method may be performed by the synoptic video system 110 in the network environment 100 described above with respect to FIG. 2-FIG. 5. Accordingly, the method is described by way of example with reference to these components in the synoptic video system 110. However, it shall be appreciated that at least some of the operations of the method may be deployed on various other hardware configurations or be performed by similar components residing elsewhere in the network environment 100. Therefore, the method is not intended to be limited to these components.

In operation 702, the content analyzer 302 analyzes one or more documents that will be used to generate the synoptic video. The content analyzer 302 comprises or accesses one or more text analyzers and ML models which are used to understand content in the documents. For instance, the content analyzer 302 uses text analyzers and ML models to identify text patterns in the documents. One or more of the ML models can determine core keywords in the documents. For example, the content analyzer 302 can use the ML models and text classifiers to identify the heaviest words or most rated words, and from there, the content analyzer 302 can determine the context.

In operation 704, the content analyzer 302 determines an entry point. In example embodiments, the keywords identified in operation 702 provide an understanding of an entry point for the text in the document. For example, based on the heaviest words or most rated words, the content analyzer 302 can determine the entry point.

In operation 706, the user data module 502 retrieves background information from the subscription system 108 which can indicate interactions and content use in the subscription system 108 through graphs. For example, the user can have an account with the subscription system 108 in which details are stored. These details can include their likes and past interactions on the subscription system 108. The graphs provide data about the interaction points from the subscription system 108 since any interaction with an application of the subscription system 108 gets stored in a substrate of the subscription system 108. Thus, the background information can indicate, for example, documents the user has interacted with or has access to. These documents can include the documents that are used to generate the synoptic videos (e.g., providing the text and/or the images). In some embodiments, operation 706 may be performed as part of operations generating the synoptic video as discussed in FIG. 8.

In operation 708, the tagger module 304 performs tagging. Tagging identifies relevant content in the document(s). The tagging can occur at two levels—generalized and specific. The crux of the content can be tagged with specific tags so that the content can be used as-is. In contrast, content that is tagged as generalized can provide an explanation or understanding that can be summarized. In some embodiments, the tagger module 304 automatically tags the content in the document(s) using machine-learning (e.g., one or more ML models) to tag the content. The tagging can be based on relevance, weights, and a word cloud. Alternatively or additionally, a user can tag the content and the tagger module 304 detects these tags.

Figure 8:
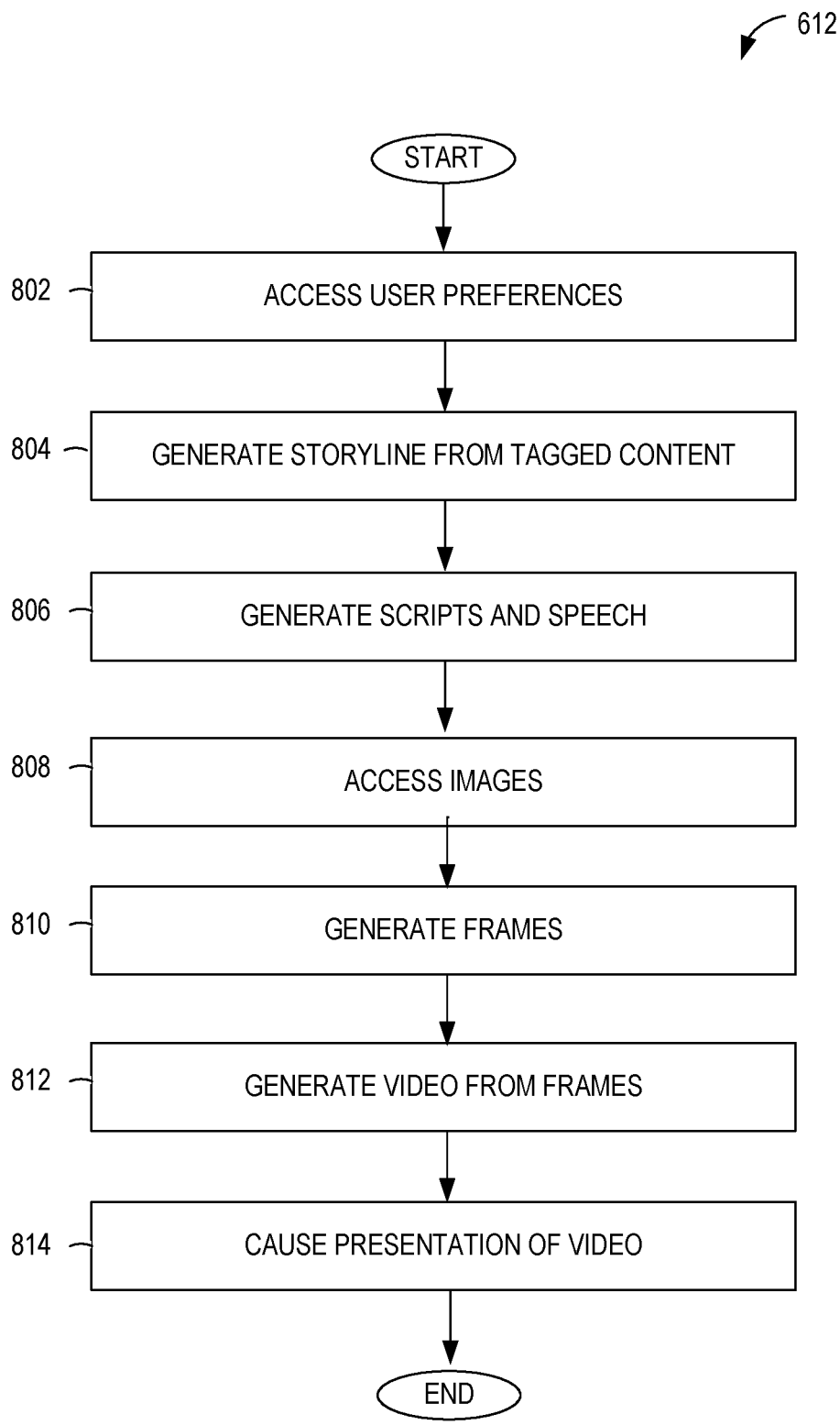
FIG. 8 is a flowchart illustrating operations of a method for generating the synoptic video, according to some example embodiments.

FIG. 8 is a flowchart illustrating operations of a method (operation 612) for generating a video, according to some example embodiments. Operations in the method may be performed by the synoptic video system 110 in the network environment 100 described above with respect to FIG. 2-FIG. 5. Accordingly, the method is described by way of example with reference to these components in the synoptic video system 110. However, it shall be appreciated that at least some of the operations of the method may be deployed on various other hardware configurations or be performed by similar components residing elsewhere in the network environment 100. Therefore, the method is not intended to be limited to these components.

In operation 802, the synoptic video system retrieves stored user preferences for the user. For example, the language module 502 retrieves the user preferences. The user preferences are used to customize the synoptic video for the user. For example, assume two users attended the same virtual meeting or lecture. If a first user has an affinity for the topic of the meeting and generally likes more images, the synoptic video may comprise more information on the topic (e.g., more in-depth) and include more visuals (e.g., images). If a second user is not as interested in the same meeting and prefers more text than imagery, the synoptic video generated for the second user may simply provide a high-level summary of the meeting using more text (and possible audio) and less images. Thus, given the same topic and document(s) (e.g., a meeting transcription), different synoptic videos may be generated for different users. Additionally, the user preferences can indicate a preferred language and style of the user.

In operation 804, the storyline generator 506 generates a storyline from tagged content. In example embodiments, the storyline generator 506 scans the text using the tags to build sentences by summarizing the tagged content into, for example a few-line description (e.g., one to two lines) for each context. In some cases, the summarizing uses ML models that generate a meaningful sentence out of a given phrase which aligns to the context of the actual content in the document. The summarized text is then used to generate the storyline.

In operation 806, the script generator 508 generates scripts for the synoptic video. In example embodiments, the script generator 508 generates the script based on the storyline (e.g., from the storyline generator 506) and the summarized text. The user preference may also be considered in generating the script. Thus, the script can indicate emotion, male/female voice, visual hints, pauses, modulation, confidence, and so forth. Based on the script, speech can be generated by the script generator 508 via a speech overlay. In example embodiments, the script generator 508 uses available ML models that convert text to speech in generating the speech overlay. Additionally, the script generator 508 can automatically generate closed captions or citations based on the script and/or the speech overlay. The closed captions can also be embedded in the synoptic video using an overlay.

In operation 808, the image module 510 accesses images for use in the synoptic video. In example embodiments, the image module 510 retrieves images from the document(s) analyzed for the synoptic video. In some cases, the image module 510 can access other document associated with the user from the subscription system 108 (e.g., identified by the user data module 502) to retrieve images for the synoptic video. For example, the documents may have been created, edited, or viewed by the user or documents that the user otherwise has access rights to.

In operation 810, the video generator 512 generate frames for the synoptic video, whereby each frame is a single page of the synoptic video. The frame can include text, one or more images, and/or audio. The frame can also include closed captioning. In example embodiments, the content and style of each frame is based, in part, on the user preferences. For example, if the user style indicates a preference for more images and less text, then the video generator 512 may generate frames having more images with reduced text. Some of these components of the frame may be embedded into the frame using overlays (e.g., speech overlay, closed caption overlay).

In operation 812, the video generator 512 generate the synoptic video from the frames. In example embodiments, the video generator 510 stitches the frames together to generate the synoptic video. In some embodiments, the video generator 510 checks that the user resonation style matches the generated synoptic video. The video generator 510 uses the user resonation style (e.g., user preferences) to perform the check. Assuming the synoptic video generally matches the user resonation style, the synoptic video can then be presented to the user.

In operation 814, the video generator 512 causes presentation of the synoptic video on a device of the user. In some cases, the synoptic video can also be stored to a sharing platform where other users can view the synoptic video.

While the operations of FIG. 6-FIG. 8 are shown in a particular order, alternative embodiments may practice the operations in a different order. Additionally, one or more of the operations may be made optional.

Figure 9:
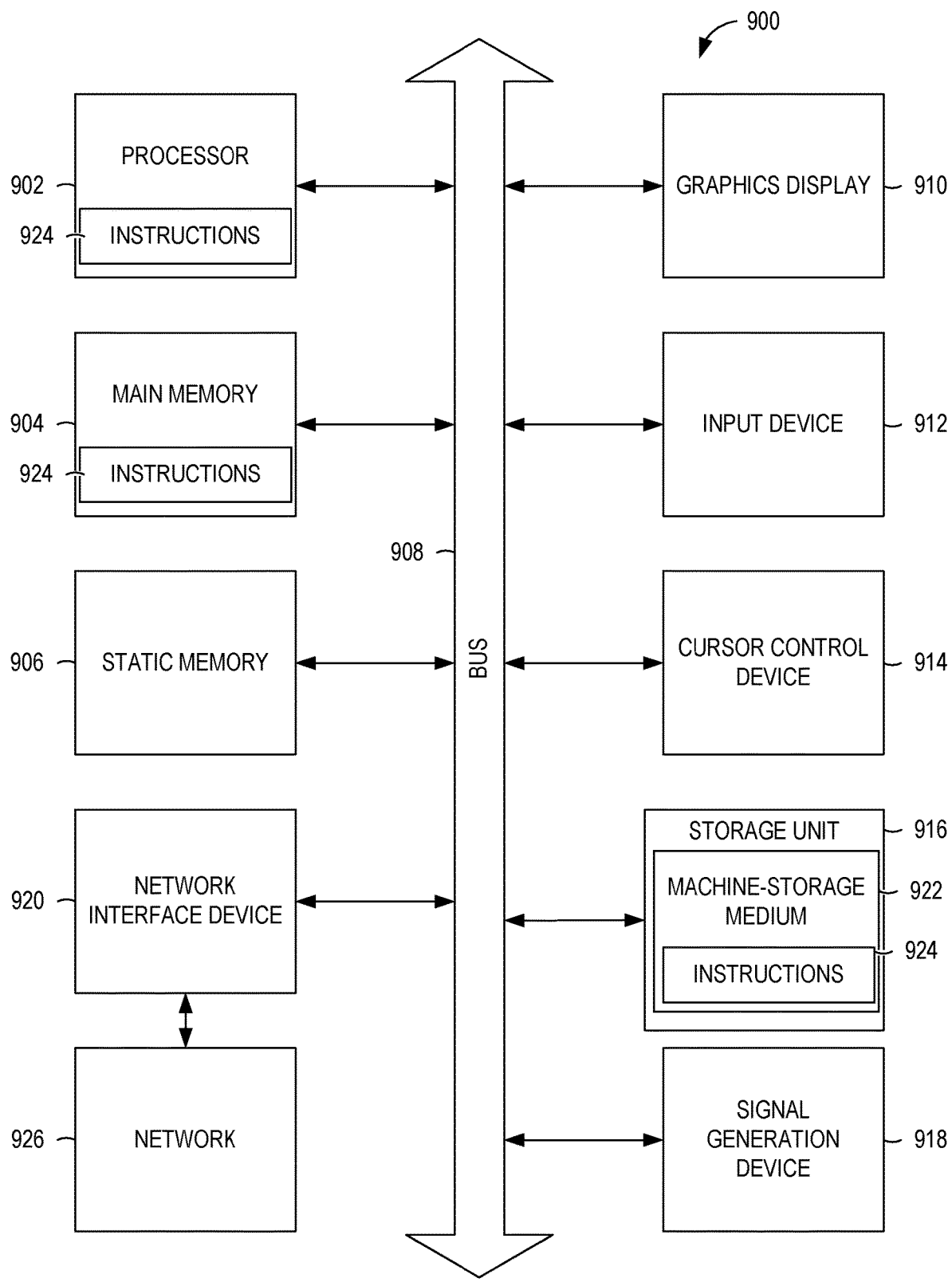
FIG. 9 is a block diagram illustrating components of a machine, according to some example embodiments, able to read instructions from a machine-storage medium and perform any one or more of the methodologies discussed herein.

FIG. 9 illustrates components of a machine 900, according to some example embodiments, that is able to read instructions from a machine-storage medium (e.g., a machine-storage device, a non-transitory machine-storage medium, a computer-storage medium, or any suitable combination thereof) and perform any one or more of the methodologies discussed herein. Specifically, FIG. 9 shows a diagrammatic representation of the machine 900 in the example form of a computer device (e.g., a computer) and within which instructions 924 (e.g., software, a program, an application, an applet, an app, or other executable code) for causing the machine 900 to perform any one or more of the methodologies discussed herein may be executed, in whole or in part.

For example, the instructions 924 may cause the machine 900 to execute the flow diagrams of FIG. 6 to FIG. 8. In one embodiment, the instructions 924 can transform the general, non-programmed machine 900 into a particular machine (e.g., specially configured machine) programmed to carry out the described and illustrated functions in the manner described.

In alternative embodiments, the machine 900 operates as a standalone device or may be connected (e.g., networked) to other machines. In a networked deployment, the machine 900 may operate in the capacity of a server machine or a client machine in a server-client network environment, or as a peer machine in a peer-to-peer (or distributed) network environment. The machine 900 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 924 (sequentially or otherwise) that specify actions to be taken by that machine. Further, while only a single machine is illustrated, the term "machine" shall also be taken to include a collection of machines that individually or jointly execute the instructions 924 to perform any one or more of the methodologies discussed herein.

The machine 900 includes a processor 902 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 904, and a static memory 906, which are configured to communicate with each other via a bus 908. The processor 902 may contain microcircuits that are configurable, temporarily or permanently, by some or all of the instructions 924 such that the processor 902 is configurable to perform any one or more of the methodologies described herein, in whole or in part. For example, a set of one or more microcircuits of the processor 902 may be configurable to execute one or more modules (e.g., software modules) described herein.

The machine 900 may further include a graphics display 910 (e.g., a plasma display panel (PDP), a light emitting diode (LED) display, a liquid crystal display (LCD), a projector, or a cathode ray tube (CRT), or any other display capable of displaying graphics or video). The machine 900 may also include an input device 912 (e.g., a keyboard), a cursor control device 914 (e.g., a mouse, a touchpad, a trackball, a joystick, a motion sensor, or other pointing instrument), a storage unit 916, a signal generation device 918 (e.g., a sound card, an amplifier, a speaker, a headphone jack, or any suitable combination thereof), and a network interface device 920.

The storage unit 916 includes a machine-storage medium 922 (e.g., a tangible machine-storage medium) on which is stored the instructions 924 (e.g., software) embodying any one or more of the methodologies or functions described herein. The instructions 924 may also reside, completely or at least partially, within the main memory 904, within the processor 902 (e.g., within the processor's cache memory), or both, before or during execution thereof by the machine 900. Accordingly, the main memory 904 and the processor 902 may be considered as machine-readable media (e.g., tangible and non-transitory machine-readable media). The instructions 924 may be transmitted or received over a network 926 via the network interface device 920.

In some example embodiments, the machine 900 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 904, 906, and/or memory of the processor(s) 902) and/or storage unit 916 may store one or more sets of instructions and data structures (e.g., software) 924 embodying or utilized by any one or more of the methodologies or functions described herein. These instructions, when executed by processor(s) 902 cause various operations to implement the disclosed embodiments.

As used herein, the terms "machine-storage medium," "device-storage medium," "computer-storage medium" (referred to collectively as "machine-storage medium 922") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 922 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage medium or media, computer-storage medium or media, and device-storage medium or media 922 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 924 may further be transmitted or received over a communications network 926 using a transmission medium via the network interface device 920 and utilizing any one of a number of well-known transfer protocols (e.g., HTTP). Examples of communication networks 926 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 924 for execution by the machine 900, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

EXAMPLES

Example 1 is a method for automatically generating a synoptic video that summarizes one or more documents. The method comprises receiving, by a network system, an indication to generate a synoptic video from one or more documents comprising text content; in response to the indication, accessing the one or more documents and user preferences of a user that are derived by the network system; analyzing, by the network system, the one or more documents to determine relevant text content, the analyzing including tagging the relevant text content; based on the user preferences, generating, by the network system, a synoptic video that summarizes the tagged relevant text content, the content of the synoptic video being based on a user style indicated by the user preferences; and causing display of the synoptic video on a device of the user.

In example 2, the subject matter of example 1 can optionally include wherein the user preferences indicate a level of depth in summarizing the relevant text content in the synoptic video, a higher level of depth resulting in deeper content on a topic of the synoptic video.

In example 3, the subject matter of any of examples 1-2 can optionally include wherein the tagging includes using generalized tags and specific tags, the generalized tags indicating content that can be summarized and the specific tags indicating content that is used as-is in generating the synoptic video.

In example 4, the subject matter of any of examples 1-3 can optionally include wherein the tagging is performed automatically by the network system using a machine-learning model that identifies the relevant text content.

In example 5, the subject matter of any of examples 1-4 can optionally include wherein the tagging comprises receiving user indications of tagging.

In example 6, the subject matter of any of examples 1-5 can optionally include wherein the analyzing the one or more documents comprises using one or more text analyzers or machine learning models to identify text patterns and core keywords in the one or more documents.

In example 7, the subject matter of any of examples 1-6 can optionally include wherein the generating the synoptic video comprises scanning the relevant text using tags applied during the tagging; generating summarized text from the scanned relevant text content; and building a storyline from the summarized text.

In example 8, the subject matter of any of examples 1-7 can optionally include wherein the generating the synoptic video comprises generating a text-to-speech overlay script based on the storyline and the user preferences; and adding a voice-over based on the text-to-speech overlay script, the voice-over being in a language associated with the user preference.

In example 9, the subject matter of any of examples 1-8 can optionally include wherein the generating the synoptic video comprises extracting a plurality of images from the one or documents; and embedding the plurality of images into one or more video frames of the synoptic video.

In example 10, the subject matter of any of examples 1-9 can optionally include wherein the generating the synoptic video comprises generating close caption content; and embedding the close caption content in the synoptic video.

In example 11, the subject matter of any of examples 1-10 can optionally include wherein the generating the synoptic video comprises translating the relevant text content from a first language of the relevant text content to a second language based on the user preferences; and generating text or audio for the synoptic video in the second language.

In example 12, the subject matter of any of examples 1-11 can optionally include deriving the user preferences based on one or more questionnaires, sample video feedback, sample topic interactions, and generated video feedback.

In example 13, the subject matter of any of examples 1-12 can optionally include capturing user feedback on the synoptic video based on user interactions with the synoptic video; and revising one or more machine-learning models or the user preferences based on the user feedback.

In example 14, the subject matter of any of examples 1-13 can optionally include storing the synoptic video to a sharing platform accessible by other users.

Example 15 is a system for automatically generating a synoptic video that summarizes one or more documents. The system comprises one or more hardware processors and a memory storing instructions that, when executed by the one or more hardware processors, cause the one or more hardware processors to perform operations comprising receiving an indication to generate a synoptic video from one or more documents comprising text content; in response to the indication, accessing the one or more documents and user preferences of a user that are derived by a network system; analyzing the one or more documents to determine relevant text content, the analyzing including tagging the relevant text content; based on the user preferences, generating a synoptic video that summarizes the tagged relevant text content, the content of the synoptic video being based on a user style indicated by the user preferences; and causing display of the synoptic video on a device of the user.

In example 16, the subject matter of example 15 can optionally include wherein the user preferences indicate a level of depth in summarizing the relevant text content in the synoptic video, a higher level of depth resulting in deeper content on a topic of the synoptic video.

In example 17, the subject matter of any of examples 15-16 can optionally include wherein the tagging includes using generalized tags and specific tags, the generalized tags indicating content that can be summarized and the specific tags indicating content that is used as-is in generating the synoptic video.

In example 18, the subject matter of any of examples 15-17 can optionally include wherein the generating the synoptic video comprises scanning the relevant text using tags applied during the tagging; generating summarized text from the scanned relevant text content; and building a storyline from the summarized text.

In example 19, the subject matter of any of examples 15-18 can optionally include wherein the generating the synoptic video comprises generating a text-to-speech overlay script based on the storyline and the user preferences; and adding a voice-over based on the text-to-speech overlay script, the voice-over being in a language associated with the user preference.

Example 20 is a computer-storage medium comprising instructions which, when executed by one or more hardware processors of a machine, cause the machine to perform operations for automatically generating a synoptic video that summarizes one or more documents. The operations comprise receiving an indication to generate a synoptic video from one or more documents comprising text content; in response to the indication, accessing the one or more documents and user preferences of a user that are derived by a network system; analyzing the one or more documents to determine relevant text content, the analyzing including tagging the relevant text content; based on the user preferences, generating a synoptic video that summarizes the tagged relevant text content, the content of the synoptic video being based on a user style indicated by the user preferences; and causing display of the synoptic video on a device of the user.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
receiving, by a network system, an indication to generate a synoptic video from one or more documents comprising deep chainable segments of text content that provides different levels of depth;
in response to the indication, accessing the one or more documents and user preferences of a user that are derived by the network system and used to customize the synoptic video to the user, the user preferences including an indication a level of interest in one or more topics;
analyzing, by the network system, the one or more documents to determine relevant text content, the analyzing including tagging the relevant text content using generalized tags and specific tags, the generalized tags indicating relevant text content providing an explanation or understanding that can be summarized and the specific tags indicating relevant text content that is a crux of the one or more documents that is used as-is in generating the synoptic video;
based on the user preferences, generating, by the network system, the synoptic video that summarizes the one or more documents, the content of the synoptic video being chosen based on the level of interest in the one or more topics and on a user style indicated by the user preferences; and
causing display of the synoptic video on a device of the user.

2. The method of claim 1, wherein generating the synoptic video comprises:
generating frames for the synoptic video, wherein each frame is a single page of the synoptic video that includes text, one or more images, and/or audio; and
stitching the frames together to generate the synoptic video.

3. The method of claim 2, further comprising:
based on the level of interest in a topic being a higher level, adding deeper content into the synoptic video by generating and stitching additional frames on the topic.

4. The method of claim 1, wherein the tagging is performed automatically by the network system using a machine-learning model that identifies the relevant text content.

5. The method of claim 1, wherein the tagging comprises receiving user indications of tagging.

6. The method of claim 1, wherein the analyzing the one or more documents comprises using one or more text analyzers or machine learning models to identify text patterns and core keywords in the one or more documents.

7. The method of claim 1, wherein the generating the synoptic video comprises:
scanning the relevant text content using the generalized and specific tags applied during the tagging;
generating summarized text from the scanned relevant text content by summarizing the tagged relevant text content with the generalized tags into a few-line descriptions; and
building a storyline from the summarized text.

8. The method of claim 7, wherein the generating the synoptic video comprises:
generating a text-to-speech overlay script based on the storyline and the user preferences; and
adding a voice-over based on the text-to-speech overlay script, the voice-over being in a language associated with the user preference.

9. The method of claim 1, wherein the generating the synoptic video comprises:
extracting a plurality of images from the one or documents; and
embedding the plurality of images into one or more video frames of the synoptic video.

10. The method of claim 1, wherein the generating the synoptic video comprises:
generating close caption content; and
embedding the close caption content in the synoptic video.

11. The method of claim 1, wherein the generating the synoptic video comprises:
translating the relevant text content from a first language of the relevant text content to a second language based on the user preferences; and
generating text or audio for the synoptic video in the second language.

12. The method of claim 1, further comprising deriving the user preferences based on one or more questionnaires, sample video feedback, sample topic interactions, and generated video feedback.

13. The method of claim 1, further comprising:
capturing user feedback on the synoptic video based on user interactions with the synoptic video; and
revising one or more machine-learning models or the user preferences based on the user feedback.

14. The method of claim 1, further comprising:
storing the synoptic video to a sharing platform accessible by other users.

15. A system comprising:
one or more hardware processors; and
a memory storing instructions that, when executed by the one or more hardware processors, cause the one or more hardware processors to perform operations comprising:
receiving an indication to generate a synoptic video from one or more documents comprising deep chainable segments of text content that provides different levels of depth;
in response to the indication, accessing the one or more documents and user preferences of a user that are derived by a network system and used to customize the synoptic video to the user, the user preferences including an indication a level of interest in one or more topics;
analyzing the one or more documents to determine relevant text content, the analyzing including tagging the relevant text content using generalized tags and specific tags, the generalized tags indicating relevant text content providing an explanation or understanding that can be summarized and the specific tags indicating relevant text content that is a crux of the one or more documents that is used as-is in generating the synoptic video;

based on the user preferences, generating the synoptic video that summarizes the one or more documents, the content of the synoptic video being chosen based on the level of interest in the one or more topics and on a user style indicated by the user preferences; and causing display of the synoptic video on a device of the user.

16. The system of claim 15, wherein generating the synoptic video comprises:

generating frames for the synoptic video, wherein each frame is a single page of the synoptic video that includes text, one or more images, and/or audio; and stitching the frames together to generate the synoptic video.

17. The system of claim 15, wherein the generating the synoptic video comprises:

scanning the relevant text content using the generalized and specific tags applied during the tagging;

generating summarized text from the scanned relevant text content by summarizing the relevant text content with the generalized tags into a few-line descriptions; and building a storyline from the summarized text.

18. The system of claim 17, wherein the generating the synoptic video comprises:

generating a text-to-speech overlay script based on the storyline and the user preferences; and adding a voice-over based on the text-to-speech overlay script, the voice-over being in a language associated with the user preference.

19. A machine-storage medium comprising instructions which, when executed by one or more hardware processors of a machine, cause the machine to perform operations comprising:

receiving an indication to generate a synoptic video from one or more documents comprising deep chainable segments of text content that provides different levels of depth;

in response to the indication, accessing the one or more documents and user preferences of a user that are derived by a network system and used to customize the synoptic video to the user, the user preferences including an indication a level of interest in one or more topics;

analyzing the one or more documents to determine relevant text content, the analyzing including tagging the relevant text content using generalized tags and specific tags, the generalized tags indicating relevant text content providing an explanation or understanding that can be summarized and the specific tags indicating relevant text content that is a crux of the one or more documents that is used as-is in generating the synoptic video;

based on the user preferences, generating the synoptic video that summarizes the one or more documents, the content of the synoptic video being chosen based on the level of interest in the one or more topics and on a user style indicated by the user preferences; and causing display of the synoptic video on a device of the user.

20. The method of claim 1, further comprising:

performing a check that a user resonation style matches the synoptic video, wherein causing display of the synoptic video occurs based on the user resonation style matching the synoptic video.

* * * * *